United States Patent
Bellenger

(10) Patent No.: US 6,188,669 B1
(45) Date of Patent: *Feb. 13, 2001

(54) APPARATUS FOR STATISTICAL MULTIPLEXING AND FLOW CONTROL OF DIGITAL SUBSCRIBER LOOP MODEMS

(75) Inventor: Donald M. Bellenger, Los Altos Hills, CA (US)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 31 days.

(21) Appl. No.: 08/877,531

(22) Filed: Jun. 17, 1997

(51) Int. Cl.[7] .................................................. H04L 23/00
(52) U.S. Cl. ......................... 370/230; 370/280; 370/442; 370/463; 370/465; 375/222; 379/93.01
(58) Field of Search .................................. 370/230, 280, 370/359, 442, 461, 463, 465, 466; 375/222, 220; 379/93.05, 399, 93.07, 27, 166

(56) References Cited

U.S. PATENT DOCUMENTS

| | | | |
|---|---|---|---|
| 5,237,561 | 8/1993 | Pyhalammi | 370/29 |
| 5,428,608 | 6/1995 | Freeman et al. | 370/60.1 |
| 5,610,910 | 3/1997 | Focsaneanu et al. | 370/351 |
| 5,668,857 | 9/1997 | McHale | 379/93.07 |
| 5,719,901 | 2/1998 | Le Riche et al. | 375/222 |
| 5,751,706 | 5/1998 | Land et al. | 370/352 |
| 5,784,683 | 7/1998 | Sistanizadeh et al. | 455/5.1 |
| 5,889,774 | 3/1999 | Mirashrafi et al. | 370/352 |
| 5,889,856 | * 3/1999 | O'Toole et al. | 379/222 |
| 5,910,970 | * 6/1999 | Lu | 375/522 |
| 5,960,036 | * 9/1999 | Johnson et al. | 375/222 |

OTHER PUBLICATIONS

Stuart, R.L.; "Clean Final Draft of Recommendation v.34"; International Telecommunications Union; Telecommunications Standardization Sector; Geneva, Jun. 1–9, 1994; pp. 1–70.

George T. Hawley, et al; Systems Considerations for the Use of xDSL Technology for Data Access; IEEE Communications Magazine; Mar. 1997; pp. 56–60.

Brownlie, J.; Draft Text of Recommendation v.8(V.id) Proposed for Resolution 1, Point 8 Application at the Corning Study Group 14 Meeting in Jun. 1994; International Telecommunications Union; Telecommunications Standardization Sector; Study Period 1993–1996; 10 pgs.

SGS–Thomson Microelectronics Guide Universal Modem Analog Front–End (UMAFE); Jun. 1995; pp. 1–50.

American National Standard for Telecommunications; Network and Customer Installation Interfaces–Asymmetrical Digital Subscriber Line (ADSL) Metallic Interface; Aug. 18, 1995; 189 pgs.

(List continued on next page.)

Primary Examiner—Chi H. Pham
Assistant Examiner—Frank Duong
(74) Attorney, Agent, or Firm—Wilson Sonsini Goodrich & Rosati

(57) ABSTRACT

The present invention provides a method and an apparatus for connecting a plurality of subscriber loops to a pool of modem resources in a way that limits the amount of modem resources that are required. The present invention uses statistical multiplexing, such as is used in Ethernet (instead of a fixed time slot TDM as is used in a telephone system) to connect the plurality of subscriber loops to the modem resources. In order to implement the statistical multiplexing, communications between a plurality of remote modems coupled to a plurality of subscriber loops and modem resources within a central site modem must be flow controlled at the carrier layer, as is done in an Ethernet.

8 Claims, 2 Drawing Sheets

OTHER PUBLICATIONS

Tim Massey, et al., Texas Instruments; Digital Signal Processing Solutions; "DSP Solutions for Telephony and Data Facsimile Modems" Application Book; 1997; 112 pgs.

G. David Forney, et al. "The V.34 High–Speed Modem Standard"; IEEE Communications Magazine; Dec. 1996; pp. 28–33.

Dennis R. Patrick; "The Telecommunications Act of 1996; Intent, Impact and Implications"; The Telecommunications Act of 1996—The Progress & Freedom Foundation; pp. 1–8.

* cited by examiner

APPARATUS FOR STATISTICAL MULTIPLEXING AND FLOW CONTROL OF DIGITAL SUBSCRIBER LOOP MODEMS

BACKGROUND

1. Field of the Invention

The present invention relates to systems for connecting telephone subscriber lines to computer networks, and more particularly to a digital subscriber loop modem located at the central office side of a plurality of subscriber loops, which uses statistical multiplexing and flow control for communications between computing resources within the central site modem and the plurality of subscriber loops.

2. Related Art

With the advent of computer networking and personal computers, public switched telephone networks (PSTNs) are increasingly being used to connect computer systems to other computer systems, and to connect computer systems to computer networks, such as the Internet. Modems are presently used to transmit data from remote computer systems through telephone switching equipment, but these modems are presently constrained by limitations of the switching circuitry in telephone system central offices. Digital subscriber loop (DSL) modems have been developed to overcome this problem by placing a modem at the telephone central office side of a subscriber loop to receive signals from a remote modem. This allows the telephone central office switching equipment to be bypassed, thereby facilitating more rapid transmission of data between a remote modem and a modem located at the central office side of a subscriber loop.

In order to build a central site modem which serves multiple subscriber loops at a telephone central office or at a private branch exchange (PBX), it is necessary to either dedicate a modem to each subscriber loop, or to find some method of allowing multiple subscriber loops to share a common pool of modem resources. Permanently attaching a modem to each subscriber loop at the central site is wasteful because the modem can only be used by the single subscriber loop to which it is permanently connected. When a subscriber is not using the modem, the modem is idle. It is therefore desirable to provide a system in which a large number of subscriber loops share a common pool of modem equipment. This allows the cost of the modem equipment to be divided across a large number of subscriber loops. This also leads to greater modem utilization because when one subscriber loop goes idle, the modem equipment to which it is connected can be switched to another active subscriber loop.

A number of possible schemes for interconnecting a plurality of subscriber loops to a common pool of modem equipment exist, but these schemes have significant drawbacks. A simple scheme is to use a collection of relays to connect the modem equipment to the subscriber loops. In general, the cost of these relays increases as the product of the number of subscriber lines multiplied by the number of modems to which they are connected. If the number of subscribers and the modems to be connected together increases significantly, the cost of such a switching system becomes greater than the cost of simply connecting a modem to each subscriber loop.

Another possibility is to use frequency division multiplexing to connect subscriber loops to modems. In this type of a system, each subscriber loop is assigned a unique frequency slot, and each subscriber loop's baseband signal is modulated up to the frequency slot, for example, 500 MHz. When a subscriber loop needs to be connected to one of the shared modems, a frequency/agile down converter is locked onto that user's frequency slot to demodulate the signal back down to baseband. Note that baseband for DSL signals is about 1 MHz. This type of system at first appears to be low cost because inexpensive cable modem parts can be used implement it. However, the problem with such a system is that both frequencies and phase relationships of up and down converters must be precisely matched. Any disturbance of these phase relationships will destroy the DSL signals. Because of these complications it does not appear such a system would be either easy to build or inexpensive. Even if such a frequency system could be built, there are other issues of providing plain old telephone service (POTS), which would add to the cost.

Another possible method of line concentration is to digitize the analog signals from subscriber loops on the line card, and then to send these signals onto a time division multiplexed (TDM) bus. The cost per subscriber is then limited to the line card functions at about $10 per line. These line card functions include battery, over-voltage, ring, supervision, codec, hybrid and test. For normal voice telephone service, such a scheme is completely practical. When the subscriber is on hook, only the minimum line card components are idle.

This TDM line concentration method will not work well for DSL modem transmissions because of the high bandwidth required to transmit a DSL signal. In order to capture a DSL signal properly, a DSL signal must be sampled at several times the highest frequency. DSL signals can vary in bandwidth depending upon which version of DSL is considered. The T1.413 standard has frequency components up to 1 MHz. Fractional capabilities may only extend up to a maximum frequency of 100 KHz. Even at drastically reduced DSL bit rates, a sampling rate of 256 K samples per second must be used. Assuming a 16-bit sample size, this results in a data rate of 4 M bits per second. This tremendous data rate must be accommodated by a digital signal processor which processes the DSL signal. For example, the Texas Instruments C6 digital signal processor, manufactured by the Texas Instruments Company, can accept at most 53 M bits per second. This means a single C6 digital signal (DSP) can accommodate about 12 sessions. This rate corresponds to the DSP capacity of approximately 12 V.34 modem simultaneously active on a single processor. A session is defined as a subscriber being simply off-hook and capable of transferring data. It does not mean that any data is actually being moved. The problem with a simple TDM design is that many users want immediate access to modem resources, but these users are not in fact sending data most of the time. The equipment is mostly idle.

There are two problems with the above-described TDM system. First, 12 users is not a statistically large enough size to get good averaging results. Second, the modem equipment is being wasted just as if it were permanently attached to each subscriber. Of course, it is possible to build a TDM switching network, and assign many more DSPs to get a larger averaging pool. However, this expands the cost in a way that may exceed the advantages gained by sharing modems on a call-to-call basis. To illustrate this point further, a V.34 modem consumes about 30 million instructions per second (MIPS) of DSP power and about four megabits per second of bandwidth in data transmissions between the codec and the DSP, while the DSP is operating in DSL mode. Data is not actually being transferred most of the time. However, resources are still required. The only purpose of keeping all this equipment running is to maintain synchronization of the clock between the two communicating modems. V.34 modems use crystal oscillators which are accurate to about 200 parts per million. The phase relationship between the two modems can drift at about a 30 hertz rate. Therefore, most of the time the 4 megabits of bandwidth is being used to carry a 30 bit signal, and the 30 MIPS of DSP computing power is being used to replace a simple phase lock loop. This is very wasteful.

What is needed is a modem resource sharing scheme wherein a subscriber loop is automatically coupled to modem resources only when data is actually being transferred across the subscriber loop. For example, if on average a subscriber is actually transferring data only ⅒th of the time, then a single DSP should be able to support about 10 times as many subscribers if the DSP resources are only used when actually needed.

SUMMARY

The present invention provides a method and an apparatus for connecting a plurality of subscriber loops to a pool of modem resources in a way that limits the amount of modem resources that are required. The present invention uses statistical multiplexing, such as is used in Ethernet, instead of a fixed time slot TDM, as is used in a telephone system, to connect the plurality of subscriber loops to the modem resources. In order to implement statistical multiplexing, communications between a plurality of remote modems coupled to a plurality of subscriber loops and modem resources within a central site modem must be flow controlled at the carrier level (layer one).

The reason that statistical multiplexing of modem resources requires flow control is that the mathematical advantage of the shared modem pool comes from flattening the peak load on the most expensive resources, for example the DSPs. If the DSP resources are required to service the unrestrained peak demand from all users capable of demanding service, then a simple TDM design would work just as well.

Flow control is a method of possibly delaying service to a user so that the average load on the DSP resources within a central site modem average out among multiple users to a more constant and efficient level. For data transmissions, these delays are imperceptible. For example, consider the well-known design of the Ethernet. One critical aspect of the Ethernet is the use of the "JAM" signal to deny service to multiple requesters when there is a conflict over the limited bandwidth on the Ethernet. These JAM signals are constantly taking place, and slight delays are not noticed by the users. The result is an extraordinarily cost efficient design.

One embodiment includes an apparatus for transmitting data, comprising: a remote modem coupled to a remote computer system; a subscriber loop with a first end, coupled to the remote modem, a central site modem, including, a subscriber loop interface coupled to a second end of the subscriber loop, a processor, including hardware and software to implement modem functions, and a first communication channel, coupled to the subscriber loop interface and the processor, for transmitting information between the subscriber loop interface and the processor; and a flow control mechanism coupled to the central site modem, the flow control mechanism including resources that limit the flow of data to the processor within the central site modem.

According to an aspect of the present invention, the subscriber loop interface in the central site modem includes a plurality of subscriber loop interfaces coupled to a plurality of subscriber loops.

According to another aspect of the present invention, the apparatus includes resources to route data across the first communication channel using statistical time division multiplexing.

One embodiment includes a remote subscriber end modem for transmitting data over a subscriber loop, comprising: a remote subscriber interface, coupled to a remote subscriber's equipment; a subscriber loop interface coupled to the subscriber loop; a communication circuit coupled to the remote subscriber loop interface and the subscriber loop interface, which converts between signals from the remote subscriber's equipment and modem signals on the subscriber loop; and a flow control mechanism, coupled to the communication circuit, the flow control mechanism communicating through the subscriber loop interface with a distant modem, to limit the flow of data through the subscriber loop.

One embodiment includes an apparatus for transmitting data over a subscriber loop, comprising: a subscriber loop interface, coupled to the subscriber loop; a processor, including hardware and software to implement modem functions; a first communication channel, coupled to the subscriber loop interface and the processor for transmitting information between the subscriber loop and interface and the processor; and a flow control mechanism coupled to the first communication channel, including resources that limit the flow of data to the processor.

One embodiment includes an analog front end device, comprising: a subscriber loop interface for coupling to a subscriber loop; a channel interface, for coupling to a digital communication channel; and a codec, coupled to the subscriber loop interface and the channel interface for converting signals between a form suitable for the subscriber loop and a form suitable for the digital communication channel, including, a linear sampling mechanism, and a non-linear sampling mechanism.

One embodiment includes an analog front end device, comprising: a subscriber loop interface for coupling to a subscriber loop; a channel interface, for coupling to a digital communication channel; and a codec, coupled to the subscriber loop interface and the channel interface for converting signals between a form suitable for the subscriber loop and a form suitable for the digital communication channel, including, a linear sampling mechanism with a sampling rate in excess of 8 KHz, and a conversion mechanism that converts the output of the linear sampling mechanism into a non-linear form.

DESCRIPTION

The following description is presented to enable any person skilled in the art to make and use the invention, and is provided in the context of a particular application and its requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiment shown, but is to be accorded the widest scope consistent with the principles and features disclosed herein.

Figure 1:
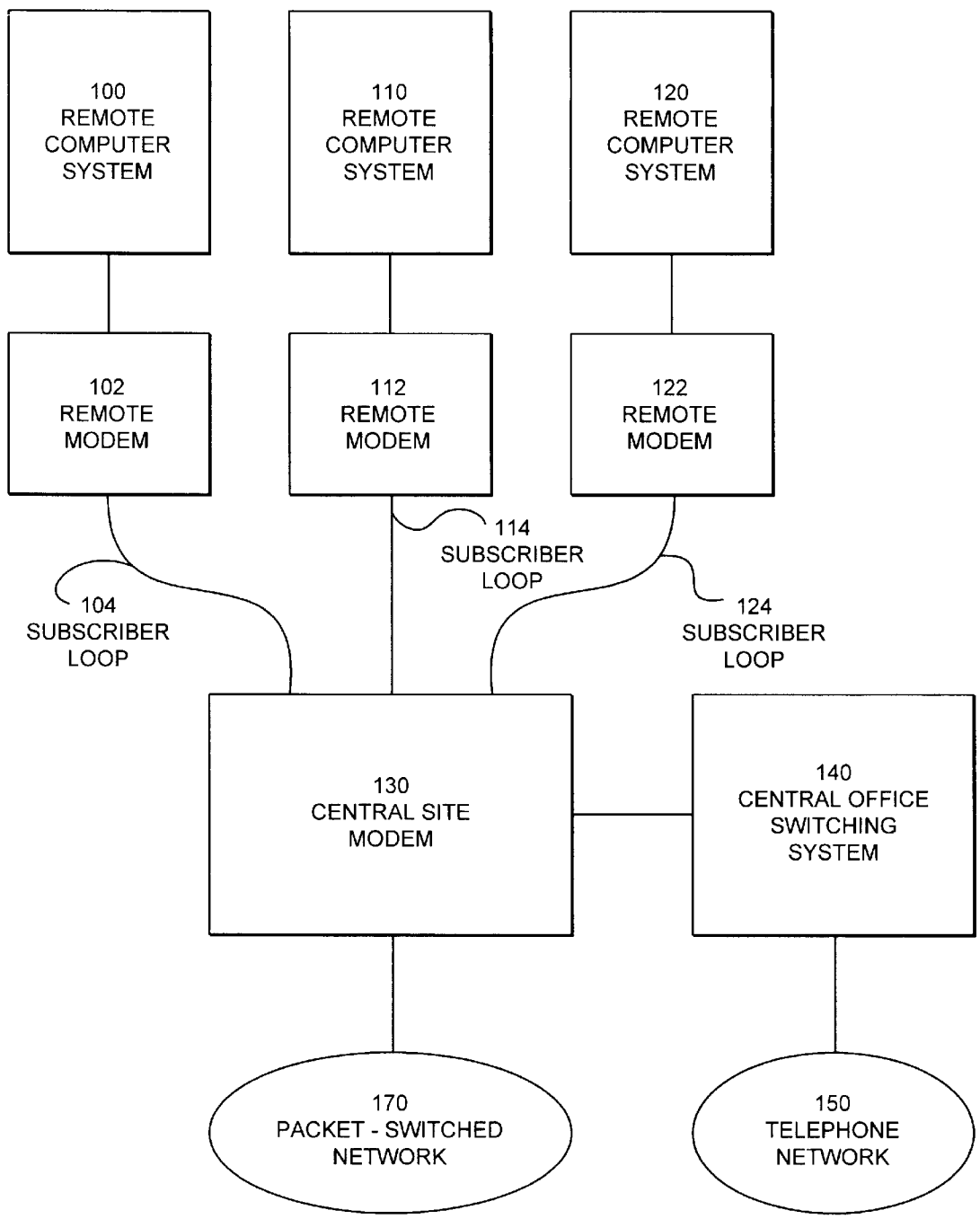
FIG. 1 is a block diagram illustrating how central site modem 130 connects to a plurality of remote modems through a plurality of subscriber loops in accordance with an aspect of the present invention.

FIG. 1 is a block diagram illustrating how central site modem 130 connects to a plurality of remote modems 102, 112 and 122, through a plurality of subscriber loops 104, 114 and 124 in accordance with an aspect of the present invention. The components of the system are connected in the following way. Remote computer system 100 connects to remote modem 102, which connects through subscriber loop 104 to central site modem 130. Remote computer system 110 connects to remote modem 112, which connects through subscriber loop 114 to central site modem 130. Remote computer system 120 connects to remote modem 122, which connects through subscriber loop 124 to central site modem 130. Central site modem 130 connects to packet-switched network 170 as well as central office switching system 140. Central office switching system 140 connects to telephone network 150.

The system illustrating in FIG. 1 operates generally as follows. Remote computer systems 100, 110 and 120 communicate through remote modems 102, 112 and 122, and through subscriber loops 104, 114 and 124 with central site modem 130. Central site modem 130 converts signals from remote modems 102, 112 and 122 into a digital form which is transmitted across packet-switched network 170 to a remote host on the packet-switched network 170. Central site modem 130 additionally includes a connection to central office switching system 140 through which modem communications as well as voice communications, from subscriber loops 104, 114 and 124 can be transmitted across telephone network 150.

Figure 2:
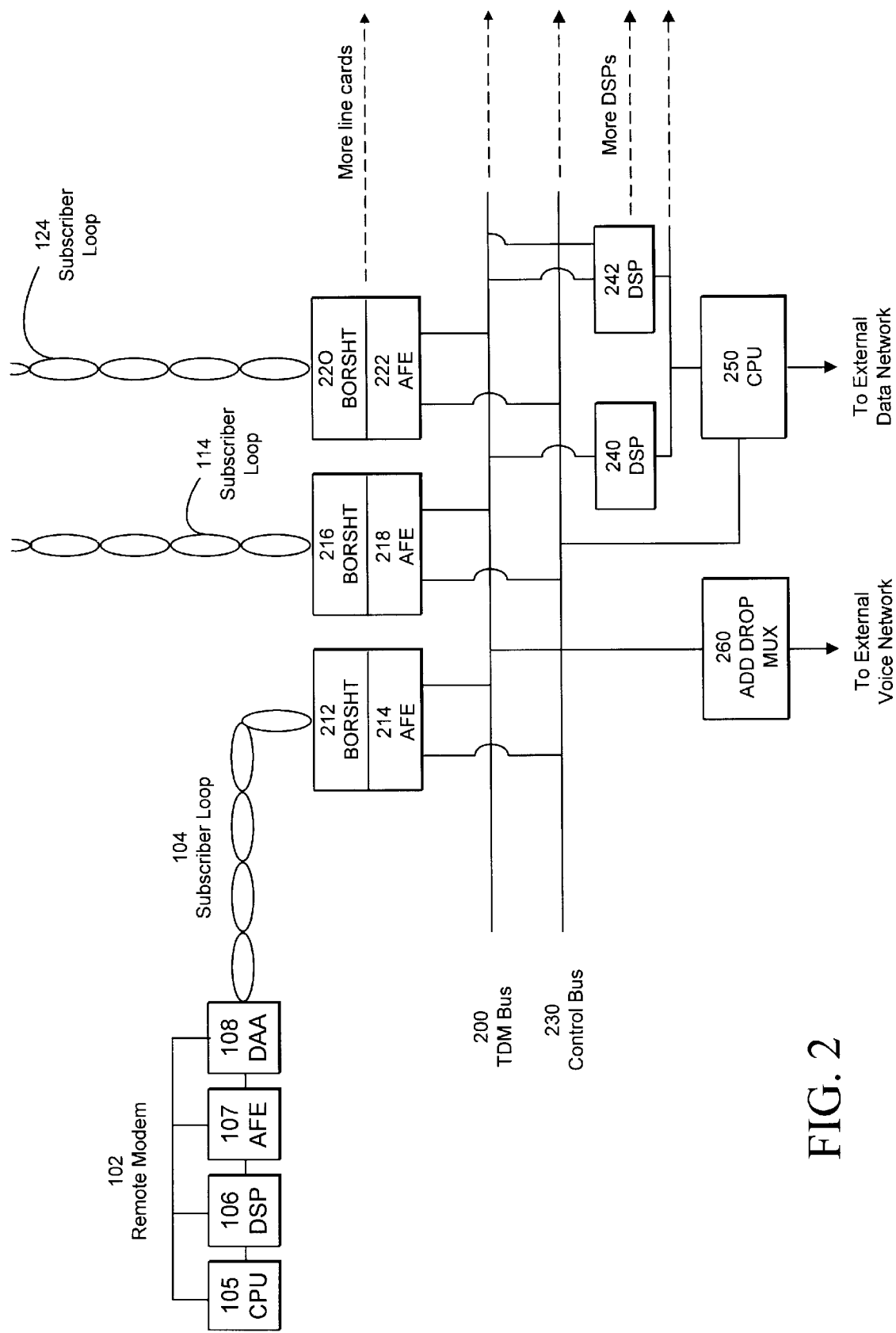
FIG. 2 is a block diagram illustrating the internal structure of central site modem 130 in accordance with an aspect of the present invention.

FIG. 2 is a block diagram illustrating some of the major functional components within remote modem 102 and central site modem 130 in accordance with an aspect of the present invention. Remote modem 102 includes: central processing unit (CPU) 105, digital signal processor (DSP) 106, analog front end (AFE) 107 and data access arrangement (DAA) 108. CPU 105 is coupled to and controls the actions of DSP 106, AFE 107 and DAA 108. CPU 105 can be any type of central processing unit. DSP 106 includes hardware and software resources to perform modem functions for remote modem 102. AFE 107 connects to and translates between the analog signals on subscriber loop 104 and the digital signals from DSP 106. AFE 107 includes a analog to digital converter and a digital to analog converter. AFE 107 is coupled through DAA 108 to subscriber loop 104. DAA 108 provides standard telephone loop interface electronics at the subscriber end of a subscriber loop. Remote modem 102 is coupled through subscriber loop 104 to BORSHT 212, which is part of central site modem 130.

Central site modem 130 includes TDM bus 200, which is coupled to AFE 214, AFE 218 and AFE 222. TDM bus 200 is additionally coupled to add drop MUX 260, DSP 240 and DSP 242. In one embodiment, TDM bus 200 includes the Texas Instruments multi-channel buffered serial port manufactured by the Texas Instruments Corporation. AFE 214 is coupled to subscriber loop 104 through BORSHT 212. AFE 218 is coupled to subscriber loop 114 through BORSHT 216. AFE 222 is coupled to subscriber loop 124 through BORSHT 220. The acronym BORSHT represents the standard telephone subscriber loop interface functions of battery feed, over voltage, ringing injection, supervision, hybrid and testing functions. This circuitry is more commonly referred to as BORSCHT, which includes a "C" for codec. The codec has been moved into the AFE of FIG. 2. Add drop MUX 260 provides an interface to an external voice network, such as a telephone network. DSP 240 and DSP 242 are coupled through CPU 250 an external data network. Central site modem 130 includes an additional control bus 230, which is coupled to AFE 214, AFE 218 and AFE 222. Control bus 230 provides signals to control the flow of data into DSP 240 and DSP 242 from subscriber loops 104, 114 and 124.

Central site modem 130 generally operates as follows. Modem signals from subscriber loop 104 pass through BORSHT 212 and AFE 214 before passing through TDM bus 200 to one of the digital signal processors. Modem signals from subscriber loop 114 passed through BORSHT 216 and AFE 218 before passing through TDM bus 200 to one of the DSPs. Modem signals from subscriber loop 124 passed through BORSHT 220 and AFE 222 before passing through TDM bus 200 to one of the DSPs. The intervening BORSHT and AFE modules perform standard telephone subscriber loop interface functions as well as analog-to-digital and digital to analog conversion. The digital signal processors, including DSP 240 and DSP 242, contain hardware and software resources to perform modem functions for central site modem 130. Digital signal processors 240 and 242 operate under control of CPU 250, which itself connects to an external data network such as the Internet. Central site modem 130 includes add drop MUX 260, which provides an interface to an external voice network, such as central office switching system 140 and telephone network 150 pictured in FIG. 1. Add drop MUX 260 provides a pathway which allows signals from subscriber loops 104, 114 and 124 to alternatively pass through a voice network such as telephone network 150.

In more detail, the system illustrated in FIG. 2 operates as follows. A user establishes a connection with central site modem 130 through a remote modem, such as remote modem 102. In the on-hook completely idle mode, before a session is set up, an idle line card is not assigned any time slot on TDM bus 200.

When a user initially goes off-hook, electronics within BORSHT 212 detect the off-hook condition and signal CPU 250 via control bus 230 that a connection is being requested. CPU 250 responds by commanding AFE 214 to sample in voice-grade mode, assigning a voice-grade time slot to AFE 214. It also assigns a fraction of the DSP pool to perform dialing recognition and progress tone generation for AFE 214. In one embodiment, voice-grade mode sampling is performed using a companding codec with 8 bits per sample and 8 K samples per second.

At this time several options are possible: the user may request a voice call; the user may request a standard V.34 modem call; or the user may request a DSL connection. Voice and standard V.34 connections result in fixed time slots being assigned on TDM bus 200. These fixed time slots cannot be multiplexed. However, they are a relatively minor load on the system because of the low data rates they require.

When a DSL connection is made, several things happen. CPU 250 commands AFE 214 to increase its sampling rate to the maximum rate and to shift from a low accuracy, non-linear companding mode to a higher accuracy linear mode. This maximum sampling rate is implementation independent. In one embodiment, the present invention uses a sampling rate of 250,000 samples per second with 16 bits per sample for a total rate of 4 megabits per second. A corresponding 4 megabits per second of the TDM bus is also assigned to the connection, and approximately 30 million instructions per second (MIPS) of the DSP pool are assigned. The user may subsequently transfer data between CPU 105 within remote modem 102 and CPU 250 within central site modem 130 at the DSL data rate.

Data transmissions occur in two directions, from CPU 105 to CPU 250, and from CPU 250 to CPU 105. Notice that bandwidth on TDM bus 200 is assigned separately for the two directions of transmission. For example, if both remote and central site ends are sending and receiving at the maximum rate, then double the rate on TDM bus 200 is required.

Statistical multiplexing now commences. For the case where CPU 250 is sending data to CPU 105, transmission continues as long as CPU 250 has data to send. When a send buffer within CPU 250 goes empty, a timer is started. If no more data arrives for transmission before the timer expires, then CPU 250, recovers both the DSP resources and the bandwidth on TDM bus 250 and commands AFE 214 to go idle. When further data arrives at CPU 250 for transmission to CPU 105, CPU 250 waits until additional DSP and TDM resources become available. Arriving data may not be transmitted immediately. It is delayed until sufficient resources are available to accommodate the data. When resources become available, CPU 250 commands the DSP resources and AFE 214 to start up. In one embodiment, a timing sequence is prefixed to the beginning of a data transmission to allow DSP 106 within remote modem 102 to recover its timing information. Typically, this sequence requires 250 milliseconds or less of transmission time. Following the timing sequence, CPU 250 begins to send data.

Flow control is additionally required when CPU 105 within remote modem 102 wishes to send data to CPU 250. The system begins in the idle condition where CPU 105 has nothing to send. In this state, there is no receive time slot assigned on TDM bus 200 and there are no DSP resources available. Next, data arrives in the transmit buffer of CPU 105. In this case, DAA 108 within remote modem 102 must know the status of TDM bus 200. A signal is sent by central site modem 130 to each remote modem indicating the state of flow control. This flow control signal may be any electromagnetic signal. In one embodiment, the flow signal is encoded in low frequency loop components below 300 Hz. This flow control signal may be a tone, a collection of tones, the polarity of the loop current, variations in loop current, meter pulses, wink, two wire wink, or any other scheme to communicate flow state. Flow state is a one bit signal which encodes the states "on" and "off." If CPU 105 was previously idle, but receives data to send, and the flow state is off, timing must be recovered. In this case, CPU 105 begins by sending the timing signal followed by data. If instead the link state were on, then no timing information is required and the data may be sent immediately with no preceding timing string.

In the off state, CPU 105 indicates a request by beginning to transmit. In this case, AFE 214 detects power from the line and requests resources via control bus 230 from CPU 250. If resources are available, they are assigned and BORSHT 212 returns a signal indicating the on state to DAA 108. CPU 105 starts a timer from the beginning of the transmission. If DAA 108 does not detect the on signal by the end of a time interval, this is interpreted as a failure to connect and the transmission is halted. No further attempt to transmit is necessary. When resources become available, the flow state switches to the on state and CPU 105 may begin to transmit. In another embodiment, CPU 105 keeps track of a time since the last request to transmit. If no response is received within that time, further requests may be made.

In different embodiments, CPU 250 assigns resources by a variety of different algorithms. In one embodiment, when surplus resources are available, bus slots are parked on the most active subscribers. When a slot is parked, the corresponding remote CPU receives the flow control signal on, and begins to send the timing signal even though it has no data to send. As long as the flow state is on, the timing is kept alive for immediate use if data arrives.

The flow control system must deal with a number of issues including race conditions, fairness and bus hogging. To prevent race conditions and other errors between CPU 105 and CPU 250, once link timing has been established in the on state, CPU 250 must obtain confirmation from CPU 105 before disconnecting. For example, consider the case where a subscriber is parked in the on state and CPU 105 begins sending at the same time CPU 250 is preparing to disconnect. In this case, CPU 250 sends the off signal to CPU 105, but it may not disconnect until CPU 105 acknowledges that it has received the off signal and is prepared to disconnect. This acknowledge signal may be any electromagnetic signal. In one embodiment, disconnect is signaled by CPU 105 remaining silent.

In one embodiment, fairness is assured by providing round robin scheduling with a maximum time limit. Any other well known method of arbitrating fairness can be used.

Bus hogging occurs when transmissions continue beyond some time limit. In one embodiment, this time limit can vary, and more particularly it varies by subscriber class of service. In another embodiment, in order to force a subscriber off TDM bus 250, CPU 250 sends an off signal. However, since this signal is being sent after the initial start up period, it is necessary for remote modem 102 and central site modem 130 to synchronize the release of the bus. Consequently, to force a subscriber off TDM bus 200, CPU 250 sends the off signal and waits for CPU 105 to respond with a terminating signal. In one embodiment, this acknowledgment of termination consists of the sender simply going silent. In another embodiment, the termination signal is encoded in a string of bits in the data stream. In yet another embodiment, the acknowledgment of termination is signaled by a change in the D.C. loop characteristics below 300 Hz, such as a short loop-open pulse. In yet other embodiments, the acknowledgment of termination is signaled by any other electromagnetic signal. After receiving this terminating signal, CPU 250 deallocates the TDM and DSP resources.

In order to protect against error conditions, CPU 250 also starts a timer after sending the off signal. If an acknowledgment of termination is not detected by the end of a particular time interval, an error is flagged.

Note that there are two flow states signaled by CPU 105 and CPU 250. These are "request," and "acknowledge." These states are orthogonal and may be indicated by a single bit, which itself may be encoded in any electromagnetic signal. For example, the signal may be encoded as a change in loop resistance, a tone, a group of tones, or any other behavior which signals flow state between CPU 105 and CPU 250. In one embodiment, CPU 105 signals the request state by changing from the silent state to a sending state. The acknowledge state is signaled by CPU 105 changing from the sending state to remaining silent. In another embodiment, CPU 105 is always sending timing information. In this case, request and acknowledge flow states may be encoded in the data streams or some other combination of signals.

Note that there are two distinct time regions which affect how the on and off flow control signals interpreted. There is an initial period measured from the beginning of a transmission during which timers measure the round trip response time. For example, remote transmission may begin with the off state and continue if an on signal is received within the allowable initial interval. Otherwise, the transmission is aborted and the data is saved for retransmission.

In contrast to the initial timing interval, there is the case where steady transmission has begun. After this initial timing interval, if an off signal is received, CPU 105 interprets this as an order to stop as soon as practical. Transmission then continues to the end of the frame and then stops. The frame being sent when the off condition is received is not saved for retransmission.

The above-described scheme for flow controlling DSL modems will give a latency of less than 250 milliseconds. This delay should be imperceptible for routine data applications such as e-mail, and web browsing.

One embodiment of the present invention allows for immediate commencement of discontinued sessions. The delay in re-establishing a session is caused by the time it takes to measure the phase between the transmit clock and the receive clock. Once this phase difference has been determined, it is possible to keep the two clocks locked in the following way. In the idle state, a tone is sent continuously between sender and receiver to maintain phase timing. AFE 214 detects this tone with a simple limiter and zero crossing counter. The zero crossings are divided down to a rate approximately 10 times the clock drift. This reduced rate signal is then sent to the DSP to maintain timing state.

For example, if the high frequency of the passband is 100 KHz, then a tone near the high edge of the band at about 100 KHz would be sent in the idle state. AFE 214 detects the signal by filtering and frequency counting. The frequency counter is divided by 256 to produce a pulse every 2.56 milliseconds. This is an approximately 390 bit per second signal, which is sent from AFE 214 to a DSP, such as, DSP 240, to maintain timing.

In order to maintain timing from central site modem 130 to remote modem 102, AFE 214 generates a pass-band signal, phase-locked to the clock of DSP 240. Central site modem 130 has a clock reference signal that must be separated from the remote modem's reference clock enough so that the reflection of the local clock does not destroy the accuracy of the mechanism for detecting the different reference. In the above-described continuous timing model, there is no requirement to send an initial timing sequence. For a transmission from remote modem 102 to central site modem 130, first CPU 105 changes its low control state from acknowledge to request, next it waits for the "on" signal, and then begins sending.

There are a number of ways to send full duplex signals on a single wire, such as a subscriber loop: the signals may be separated in time; they may be separated in frequency; or they may be separated with echo cancelers. Of these three methods, digital echo cancellation is the most complex, and is used to obtain maximum bit rate performance, such as in the case of V.34 modems. In the DSL modem case, it is assumed that there is more bandwidth available in the subscriber loop than can actually be used. Consequently, digital echo cancellation is not strictly necessary. Frequency separation, also known as frequency division multiplexing (FDM), is an intermediate complexity solution. It was commonly used during the 1980s in such modulation schemes as V.22. This method is useful when the two modems have no precise method of synchronizing state, such as in a modem connection through a common public switched telephone network (PSTN). Only the telephone voice band is used for signaling. If all of the bandwidth is dedicated to a single direction, then there is no obvious way to coordinate a reversal of the transmit direction.

In contrast with the two above cases, a DSL flow controlled modem allows for an additional channel in the DC loop current signals, defined as any signal below the 300 Hz lower limit of the voice band. Additional signaling spaces are also available in the greatly extended channel bandwidth.

In another embodiment, flow control signals are completely contained within half duplex payload data streams.

Half duplex operation allows all of the bandwidth to be used in a single direction. Given that flow control is required to coordinate central site resources anyway, the signals may additionally be used to coordinate time domain separation. Also, given increased modem speed, and the low cost of buffer memory, the ping-pong effect of half duplex operation will be invisible to the user. Furthermore, cross-talk interference between adjacent ADSL lines should not limit operations described here because frequency components are much lower.

In one embodiment, several flow-control states are defined. When both central site and remote transmitter are idle, neither has any data to send. The central site transmitter sends the off-signals and the remote transmitter sends the acknowledge signal. When the central site transmitter wishes to send and the remote transmitter is idle, the central site transmitter maintains the off signal and begins to send. When the remote transmitter wishes to send, and the central site transmitter is idle, the remote transmitter changes its state from acknowledge to request and waits for the central site transmitter to change state from off to on. Then the remote transmitter begins to send. If the central site transmitter wishes to send and the remote transmitter is active, the central site transmitter changes state from on to off and waits for the remote transmitter to change state from request to acknowledge. The central site transmitter then begins to send. If the remote transmitter wishes to send and the central site transmitter is active, the remote transmitter changes state from acknowledge to request and waits for the central site transmitter to change status from off to on. The remote transmitter then begins to send.

With the four above-mentioned flow control states: off, on, request, and acknowledge, the remote and central site systems are completely synchronized. Note that the four states can be expressed as two flow controls bits, one from remote to central, and one from central to remote.

If frequency division multiplexing is used, the remote transmitter may signal its flow state by being active or quiet. However, in the half duplex case, the remote transmitter must signal flow explicitly by encoding this state outside of the common shared data channel. In this case, where continuous clock synchronization is maintained, only frequency division multiplexing may be used.

Half duplex operation requires re-establishing timing on each reversal of direction. However, acquiring timing in half duplex mode should be quite fast. For example, approximately 16 symbol times should be required to re-establish timing. At 100,000 symbols per second, this would require 160 microseconds. Assuming quadrature amplitude modulation (QAM) 16 modulation, timing information would require an additional 64 bits of overhead per burst transmission period.

In a half duplex system, a frame or burst length must be long enough to reduce clock synchronization overhead to an insignificant factor in performance. In one embodiment, an Ethernet frame is used. Each frame is pre-fixed with an 8 byte clock timing sequence, followed by data and flow control status information. For frames sent from central site modem 132 to remote modem 102, the flow status information would inform the remote modem of how many frames it is allowed to send on the next cycle. For frames sent from remote modem 102 to central site modem 130, the flow status information informs the central site modem of how much the remote modem has available to send.

In an idle situation, central site modem 130 is continually polling the remote modems with empty messages, which say only that the remote modems are permitted to send. The remote modems similarly send messages to the central site modems saying they have nothing to send. Even when TDM bus 200 is busy, this flow information is a negligible fraction of the total traffic on TDM bus 200. Furthermore, the latency on TDM bus 200 is small enough compared to the buffer memories on each end that the control latency is not a significant factor in performance. In another embodiment, a hybrid scheme for flow control is used wherein flow control is contained in a payload and DC loop signals are used only to wake up or interrupt transmitters or receivers.

The foregoing descriptions of embodiments of the invention have been presented for purposes of illustration and description only. They are not intended to be exhaustive or to limit the invention to the forms disclosed. Many modifications and variations will be apparent to practitioners skilled in the art.

What is claimed is:

1. A method for controlling data flow between a remote computer system and a plurality of networks, comprising:

detecting that a request for a connection between the remote computer and the plurality of networks is being made;

in response, signaling to a processor that the request is being made, wherein the processor is coupled to a data network of the plurality of networks;

assigning a voice-grade time slot to an analog front end;

if the request is for a voice call, assigning a fixed time slot on a time division multiplex bus coupled between the remote computer and the plurality of networks;

if the request is for a standard modem call, assigning a fixed time slot on a time division multiplex (TDM) bus coupled between the remote computer and the plurality of networks; and if the request is for a digital subscriber loop connection, increasing a signal sampling rate to a maximum rate; shifting to a higher accuracy companding mode; assigning some bandwidth of the TDM bus to the requested connection; and
assigning a portion of a digital signal processing (DSP) resources to the requested connection.

2. The method of claim 1, further comprising:

while data is available to be sent from the processor to the remote computer over the requested connection, transmitting the data over the requested connection;

when a send buffer in the processor is empty, starting a timer;

if data to be transmitted from the processor is available before the timer expires, delaying the data until DSP resources and bandwidth on the TDM bus become available to transmit the data.

3. The method of claim 2, further comprising:

when DSP resources and bandwidth on the TDM bus become available, the processor starting the analog front end and the DSP resources; and the DSP resources recovering timing information using a timing sequence prefixed to the data to be transmitted.

4. The method of claim 1, further comprising:

while data is available to be sent from the remote computer to the processor over the requested connection, the remote computer receiving a flow signal that indicates whether a flow state is on or off;

if the flow state is off, the remote computer sending a timing signal followed by data; and if the flow state if on, the remote computer sending data.

5. The method of claim 4, further comprising:

the remote computer starting a timer concurrent with the request for a connection; and if the timer expires without the remote computer receiving a response, resending the request for a connection.

6. The method of claim 1, further comprising:

the processor assigning resources, comprising,
parking bus slots on most active remote computers;
a remote computer receiving a signal that the flow state is on; and
in response, the remote computer transmitting a timing signal.

7. The method of claim 6, further comprising:

the processor sending a signal indicating that the flow state is off to a remote computer;

the processor receiving an acknowledgement signal from the remote computer; and in response, the processor disconnecting the remote computer.

8. The method of claim 7, further comprising the processor arbitrating access to resources using round robin scheduling with a maximum time limit for connection by any remote computer.

* * * * *